United States Patent [19]

Tortai

[11] 4,046,730

[45] Sept. 6, 1977

[54] VINYL CHLORIDE POLYMER LATEXES WITH TWO MONODISPERSE MODES

[75] Inventor: Jean-Pierre Tortai, Villers Saint-Sepulcre, France

[73] Assignee: Produits Chimiques Ugine Kuhlmann, Saint-Denis, France

[21] Appl. No.: 610,285

[22] Filed: Sept. 4, 1975

[30] Foreign Application Priority Data

Sept. 24, 1974 France .................................. 74.32094

[51] Int. Cl.$^2$ .............................................. C08L 27/06
[52] U.S. Cl. ...................... 260/29.6 RB; 260/29.6 R; 260/884
[58] Field of Search ................... 260/29.6 R, 29.6 RB, 260/884

[56] References Cited

U.S. PATENT DOCUMENTS

| 3,424,706 | 1/1969 | Smith et al. .................. 260/29.6 RB |
| 3,578,648 | 5/1971 | Taima et al. ......................... 260/87.5 |
| 3,725,367 | 4/1973 | Kemp ................................. 260/80.81 |

*Primary Examiner*—Lorenzo B. Hayes
*Attorney, Agent, or Firm*—Pennie & Edmonds

[57] ABSTRACT

Method of preparing a stable latex having two substantially monodisperse populations of vinyl chloride polymer particles, which method comprises polymerizing, in aqueous emulsion, vinyl-polymerizable monomers containing at least 60% by weight vinyl chloride, in the presence of both a. a vinyl chloride polymer seed latex providing between about 0.5 and 20% of dry solids based on total weight of said monomers, having particles of mean diameter between about 0.15 and 0.6 microns and having a "first" surfactant in amount corresponding to a seed-particle surface coverage of from 5% to 100%, and b. a "second" surfactant of different chemical type in amount corresponding to from about 0.01% to 2% by weight of total monomer, wherein the chemical type of each surfactant is non-ionic or carboxylate or sulfonate or sulfate or sulfosuccinate, but wherein the chemical type of the "second" surfactant is different from the chemical type of the "first" surfactant.

The mean particle diameters of the two obtained populations are respectively between about 0.1 and 0.5 microns and between about 0.6 and 2 microns; the proportion of the smaller size particles being about 5% – 50% by weight; of the larger particles being correspondingly about 95% – 50%, i.e. the ratio of smaller/larger ranges from 5/95 to 50/50 by weight. These latexes are particularly useful for conversion by conventional processes into powders for manufacture of pastes and plastisols.

6 Claims, No Drawings

VINYL CHLORIDE POLYMER LATEXES WITH TWO MONODISPERSE MODES

BACKGROUND OF THE INVENTION

Early reference to polymerization of vinyl chloride in aqueous emulsion is found in U.S. Pat. No. 2,068,424. Subsequent modifications in technique have included preliminary emulsification of the monomer in a colloid mill with monomer-soluble free-radical donors as initiators, such as described in French Pat. No. 1,065,575. Also, both continuous and discontinuous procedures using water-soluble free-radical donors were exemplarily described in French Pat. No. 1,148,144. However, these methods produce latexes whose mechanical stability is mediocre and to polymers whose properties are not uniform.

Several methods using the technique known as seeding have been developed for controlling the size of the latex particles formed during the course of polymerization. Particle sizes up to about 2 microns are obtainable with a very narrow distribution. Thus, French Pat. No. 989,225 described the use of seeding to obtain uniform latex particles of diameter larger than 0.5 micron. Seed latexes are prepared by the known techniques of conventional emulsion polymerization. They provide preformed particles which serve as nuclei for subsequent polymerization.

In the application of latexes, the constancy of uniformity of product quality is of prime importance. This is particularly so in the case of vinyl chloride polymer latexes which are converted to dispersions in a plasticizer, generally known as plastisols or pastes. The particle size of the resins intended for such applications must conform to very precise criteria. Thus, resins containing considerable amounts of particles whose diameter is less than about 0.1 micron are not appropriate for such applications because they have a tendency to cause very significant increases in plastisol viscosity on standing in storage. On the other hand, if the particles contain a substantial fraction having a size greater than about 2 microns, there is a marked tendency for the plastisol to settle out or to separate into different liquid layers (often termed "syneresis") on prolonged storage awaiting use. Resins whose particle size is between about 0.1 and 2 microns serve particularly well for the preparation of plastisols.

Although a particle size distributed regularly between 0.1 and 2 microns is useful, products of better quality are obtained by mixing populations of different size in certain known proportions. This mixture technique is described in U.S. Pat. No. 2,553,916. By varying the proportion and size of the two populations, it is possible to obtain different desired application properties. Advantageous use can exemplarily be made of mixtures comprising from about 10 to 40% by weight of monodisperse particles having average diameter between about 0.1 and 0.5 micron, with correspondingly about 90 to 60% by weight of monodisperse particles of average diameter between about 0.5 and 2 microns.

Prior techniques directed to the attainment of such mixtures consist in preparing two monodisperse latexes separately; one having particle size between about 0.1 and 0.5 micron and the other having particle size between about 0.5 and 2 microns, the latter being obtained according to the technique known as seeding. The latexes obtained are subsequently mixed in the desired proportions and the mixture submitted to the usual finishing steps such as spray-drying, hot-drum drying, flocculation or others.

However, a particular deficiency of these prior art methods for obtaining monodisperse latexes is that they have not been amenable to working with higher concentrations. In the majority of cases, a dry-solids content of 45% by weight represents the maximum. Furthermore, the tendency of monodisperse latexes to flocculate is a well-recognized fact.

An improvement in procedure, described in British Pat. No. 928,556, consists in mixing two or more seed latexes of different sizes and carrying out the polymerization using the mixture of seed latexes as the nuclei. However, although this technique avoids the final mixing step, it still requires conducting at least three polymerization operations to arrive at the final product, namely preparation of the first seed latex, preparation of the second seed latex and final polymerization using the mixed seed.

SUMMARY OF THE INVENTION

The procedure according to the present invention accomplishes the obtainment of a latex having two populations of substantially monodisperse particle size, without making more than two polymerization operations. The latexes obtained by this new procedure contain one monodisperse population having average particle diameter between about 0.1 and 0.5 micron and another monodisperse population having average particle diameter lower than about 2 microns and higher than about 0.5 micron.

The proportion by weight of particles having mean diameter between about 0.1 and 0.5 micron is between about 5% and 50%, preferably between about 10% and 40%.

The present method comprises polymerizing, in aqueous emulsion, vinyl-polymerizable monomers containing at least 60% by weight vinyl chloride, in the presence of both a. a seed latex providing between about 0.5 and 20% of dry solids based on total weight of said monomers, having particles of mean diameter between about 0.15 and 0.6 micron and having a first surfactant in amount corresponding to a seed particle surface coverage of from 5% to 100%, and b. a second surfactant of different chemical type in amount corresponding to from about 0.01% to 2% by weight of total monomer, wherein the chemical type of each surfactant is nonionic or carboxylate or sulfonate or sulfate or sulfosuccinate, but wherein the chemical type of the second surfactant is different from the chemical type of the first surfactant.

DETAILED DESCRIPTION

The method of the present invention is particularly advantageous for preparing latexes whose dry-solids content is high, as, for example, greater than about 45% and up to about 65%. The preferred solids content is between about 48% and 60%. The productivity of the equipment is thus substantially increased, in comparison to conventional manufacture which is limited to making latexes with solids no higher than about 45%.

The present method comprises carrying out an emulsion polymerization in known manner according to procedures described for example in French Pats. Nos. 989,225 or 1,148,144 but in the presence of the particular seed latex and surfactants as claimed and described herein. The polymerization of the monomers takes place in an aqueous emulsifying phase containing dispersed therein said seed latex and surfactants together with a water-soluble initiating system.

The instant method is suitably carried out in autoclaves or reactors such as conventionally used for emulsion polymerization. These are equipped with agitation systems and with cooling and heating means necessary to regulate temperature. Temperatures of polymerization are those usually used in aqueous emulsion polymerization of vinyl chloride, from about 20° to about 80° C, preferably between about 35° and 65° C.

All the monomer can be introduced into the reactor at the start, or in successive finite fractions, or in a continuous manner throughout the entire operation.

The seed latex is prepared according to procedures which are conventional for the emulsion polymerization of monodisperse latexes. Examples of such preparations are found, for example, in the prior art referred to herein.

The amount of surfactant used to prepare and protect the seed latex can depend upon the relative particle size and dry-solids content of the seed latex, as will be understood by those skilled in the art of emulsion polymerization. This "first surfactant" must be present in quantity such that the fraction of the total seed surface area covered by the surfactant is between about 5 and 100%, preferably between about 10 and 60%, the fraction covered being defined as the ratio between the surface protected by the emulsifier and the total surface of the latex particles; see J. E. Van de Gaer, Journal of Applied Polymer Science, 9, 2929–2938 (1965). In general, the amount of surfactant used in this way can correspond to from about 0.02% to 2% based on weight of monomer used to prepare the seed latex. The monomer to be polymerized into seed latex can be vinyl chloride or any of the mixtures discussed in detail below, containing at least 60% by weight of vinyl chloride.

The mean diameter of the seed latex particles can be between about 0.15 micron and 0.6 micron, preferably between about 0.2 micron and 0.45 micron.

The seed dispersed in the aqueous emulsifying phase is advantageously such that the weight of dry solids is between about 0.5 and 20% of the weight of monomer, preferably the weight of dry seeds solids is between about 1 and 10% of the monomer weight. The amount of the first surfactant with respect to total monomer, or to total polymer, is thus between about 0.0001% and 0.4%.

The "second surfactant" is dispersed in the emulsifying phase or reaction medium such that its weight is between about 0.01% and 2% based on the weight of total monomers, preferably between about 0.02% and 1%. The surfactant and the seed can be introduced together or separately into the reaction medium at the start of polymerization but preferably, before introducing the monomer. In general this surfactant can also be formed in situ before the polymerization. Thus, exemplarily, stearic acid or a long-chain alkyl sulfonic acid can be added dissolved in monomer and aqueous sodium hydroxide can then be added, forming sodium stearate or alkyl sulfonate surfactant.

As is well known, the emulsifiers or surfactants used in emulsion polymerization characteristically have two connected molecular parts, a hydrophobic or lipophilic part which is more soluble in the monomer phase, and a hydrophilic or polar part which is more soluble in the aqueous dispersing phase. In the present disclosure, the surfactants useful in carrying out the method of this invention are distinguished from each other as to their chemical nature of the hydrophilic part and are considered as being of five different chemical types according to the chemical nature of the hydrophilic part. Thus these chemical types are herein defined as being respectively non-ionic, carboxylate, sulfonate, sulfate or sulfosuccinate. These categories are defined in greater detail below. It is to be understood that the first surfactant used in preparing and protecting the seed latex particles, can belong to any one of these five chemical types or categories, and that the second surfactant added to the emulsifying phase later, and present along with seed latex during the main polymerization of this method, can belong to any one of the remaining four chemical types or categories but must not belong to the same chemical type as the first seed-latex surfactant.

A required limitation which distinguishes the method of the present invention is that the first surfactant used to prepare the seed latex and the second surfactant used at the start of the main polymerization must not be of the same chemical type as hereindefined.

As examples of nonionic chemical type surfactants, there can be mentioned in particular the products of addition of alkylene oxides to alcohols with 8–20 carbons, to phenols, to fatty acids with 8–20 carbons and the like, and to esters of fatty acids with alcohols such as the monolaurate of sorbitol. Nonionic surfactants are described in M. J. Schick "Nonionic Surfactants", Marcel Dekker Inc., New York 1967. In particular, poloxyethylene alkyl phenols are prepared by reaction of ethylene oxide with alkyl phenols according to U.S. Pat. No. 2,213,477. The alkyl on the phenol can be any alkyl group, straight chain or branched having from 8 to 20 carbon atoms. The most suitable alkyl groups are isooctyl, octyl and nonyl. Phenols with 2 or 3 alkyls can also be used. The poly (ethylene oxy) sorbitan monooleates, monostearates and monolaurates which can be used as nonionic surfactants in this invention are commonly known as "Tweens". See also U.S. Pats. Nos. 2,374,931 and 2,380,166. Nonionic surfactants also include cellulose derivatives such as methyl cellulose, carboxymethyl cellulose and the like; and products obtained by partial hydrolysis of poly (vinyl acetate), known under the name of polyvinyl alcohols.

The four remaining chemical types of surfactants which can be used in carrying out the present method are all anionic, being the sodium, potassium, lithium or ammonium salts or respectively carboxylic, sulfonic, alkyl-sulfuric or sulfosuccinic acids. The surfactants are herein designated as corresponding carboxylates, sulfonates, esterified sulfates and sulfosuccinates, it being understood that these anions have opposite counter-ions which are alkali-metal cations or ammonium ion.

The carboxylate chemical type of surfactant can be, for example, the salts of saturated linear or branched fatty acids having from 8 to 22 carbon atoms and preferably from 10 to 18 carbon atoms, such as lauric, myristic, palmitic, stearic acid or of the acids obtained by oxosynthesis such as cekanoic acid; of unsaturated acids such as oleic acid; or of modified fatty acids such as $C_8$–$C_{20}$ carboxylic acids sulfonated in the alpha position.

The sulfonate chemical type of surfactant can be, for example, sulfonated paraffins having 10 to 22 carbon atoms and alkylaryl sulfonates such as sulfonated alkylbenzenes, alkylnaphthalenes, alkyldiphenyl ethers and the like, wherein the alkyls have 8 to 20 carbon atoms.

The sulfate chemical type of surfactant can be sulfate esters of fatty alcohols having from 10 to 20 atoms of carbon, as for example sodium lauryl sulfate.

The sulfosuccinate chemical type of surfactant can be $C_4$-$C_{20}$ alkyl sulfosuccinates, such as, for example, sodium dioctyl sulfosuccinate or ammonium diamyl sulfosuccinates.

In the course of the aqueous emulsion polymerization, a third surfactant can be added to assure the continued protection of the particles while growing, a procedure well-known to persons skilled in the art. This third surfactant can suitably be of the same chemical nature or type as that of either surfactant previously used. If this surfactant is identical either to the first one used to protect the seed latex particles, or to the later added second one whose chemical nature is different from said first one, its quantity does not interfere with those previously defined. The third surfactant can be formed in situ during the course of polymerization, as for example, by first adding a fatty acid and then converting this to a surfactant by the addition of sufficient alkali. The addition of alkali can be gradual.

The method of the instant invention can be carried out using vinyl chloride as sole monomer, or using a mixture of monomers containing at least about 60% by weight, preferably 80% by weight, of vinyl chloride with an ethylenically unsaturated monomer. Thus, when vinyl chloride is sole monomer the resulting vinyl chloride polymer is a homopolymer of vinyl chloride; and when a comonomer is also used, the resulting vinyl chloride polymer is a copolymer. Monomers which are suitable as comonomers in the method of this invention include exemplarily vinylidene chloride, vinyl fluoride, vinylidene fluoride, unsaturated acids such as maleic acid, fumaric acid, acrylic acid, methacrylic acid and the like; the mono- and di-esters corresponding to the esterification of said unsaturated acids with $C_1$-$C_{12}$ linear or branched alcohols; olefins such as ethylene, propylene, isobutylene; as well as styrene and acrylonitrile, and unsaturated esters corresponding to vinyl, allyl and isopropenyl esters of straight or branched $C_1$-$C_{15}$ carboxylic acids, such as vinyl acetate, propionate, butyrate, ethylhexanoate and laurate; and likewise unsaturated esters prepared from branched acids obtained by the oxosynthesis as for example the mixed vinyl esters of cekanoic acid.

Free radical donors which can be used as initiators in the method of this invention can be the water-soluble peroxides such as sodium, potassium or ammonium persulfate, hydrogen peroxide, the perborates, tertiary butyl hydroperoxide or any other water-soluble peroxide, used alone or in association with a reducing agent to form a system known as a redox system. Such reducing agents include rongalite, otherwise known as sodium formaldehyde sulfoxylate, sodium sulfite, sodium metabisulfite $Na_2S_2O_5$, sodium thiosulfate and the like, optionally associated with metal cations such as those of copper and iron.

The amounts of initiating system to be used depend on the desired rate of polymerization and other factors well-known in the art. Preferably the aqueous emulsifying composition contains between about 0.01 and 5%, especially from about 0.02 to 2%, by weight, of initiator. If a reducing agent is used, this also is used in amount totaling between about 0.01 and 5%, especially from 0.02 to 2% by weight of the finished latex.

As will be understood by those trained in the art, it is sometimes desirable to adjust the pH of the aqueous phase during polymerization, as for example to control the formation of free radicals from some initiators, or to assure the ionization of weak acid surfactants into the anionic state. For such purposes, buffers can be used and can illustratively be sodium bicarbonate, sodium carbonate, borax, sodium acetate or alkali metal phosphates. The polymerization can also be carried out in the presence of a base such as, for example, ammonia, sodium hydroxide or potassium hydroxide.

A chain transfer agent to regulate molecular weight can likewise be used, as for example a mercaptan, chloroform, carbon tetrabromide, dichloroethylene or trichloroethylene and in general the halogenated derivatives of methane.

The invention is further illustrated by description in connection with the following specific examples of the practice of it, wherein as also elsewhere herein proportions are by weight unless otherwise stated. The particle sizes reported herein are average particle sizes and respective percentages of the particular monodisperse populations can be determined by electron microscopy or by a sedimentation method such as ultracentrifugation.

EXAMPLE 1

Into a stainless steel autoclave of three-liter capacity equipped with an agitation system turning at 250 revolutions per minute, there is introduced:
800 g Water
33 g Seed latex providing an amount of dry solids equal to 1% by weight of the monomer; average particle size 0.15 micron; dry solids content 30% by weight; containing sufficient sodium lauryl sulfate (TEXAPON) to insure 55% coverage of particle surface,
3 g Sodium Bicarbonate
2 g Potassium Persulfate
1 g Diamyl sulfosuccinate, sodium salt (corresponding to 0.1%, by weight, of monomer)

After the pressure is reduced to 600-700 mm of Hg, 1000 grams of vinyl chloride are pumped in and the temperature of the autoclave is brought to 50° C. 10 grams of sodium lauryl sulfate (TEXAPON) dissolved in 200 cc. of water in four equal fractions are then added respectively after 1 hour, 1.5 hours, 2 hours and 2.5 hours of reaction. The latex obtained has a solids content equal to 45%. The particle size distribution has two monodisperse populations; 66% by weight of the particles have a diameter of 0.6 micron, 34% by weight have a diameter of 0.3 micron.

EXAMPLE 2

Into a stainless steel autoclave of three-liter capacity equipped with an agitation system turning at 150 revolutions per minute, there is introduced:
700 g Water
62 g Seed latex, providing an amount of dry solids equal to 2.3% by weight of monomer; average particle size 0.2 micron; dry solids content 37% by weight; containing sufficient sodium laurate to insure 30% coverage of particle surface.
3 g Sodium Hydroxide
5 g Potassium Persulfate
1.5 g Dioctyl sulfosuccinate, sodium salt (corresponding to 0.15% by weight, of the monomer)

After the pressure is reduced to 600-700 mm of Hg 150 grams of vinyl chloride are charged. The temperature of the autoclave is raised to 45° C. When the pressure falls, 850 grams of vinyl chloride are added continuously over a period of 3 hours, as well as a solution of 7 of the sodium salt of a sulfonated alkyl-diphenylether (DOWFAX 2A1) dissolved in 250 grams of water. The latex obtained has a solids content equal to 48%. Its particle size distribution has two monodisperse populations; 81% by weight of the particles have size 0.65 micron and 19% have size 0.25 micron.

EXAMPLE 3

Into a stainless steel autoclave of capacity 3 liters with an agitation system turning at 100 rpm there is introduced:

- 400 g Water
- 75 g Seed latex, providing an amount of dry solids equal to 3% by weight of the monomer; particle size 0.3 microns; dry solids content 40% by weight; containing sufficient sodium alkyl sulfonate (Mersolat) to insure 45% coverage of particle surface.
- 4 g Sodium Perborate
- 3 g Borax
- 2 g Sodium myristate (corresponding to 0.2% by weight of the monomer)

A vacuum of 600 to 700 mm of Hg is effected in the autoclave, then 200 g of vinyl chloride is charged. The mixture is heated to 50° C. When the pressure falls by 0.5 Kg/cm$^2$; there is added 800 grams of vinyl chloride in such a manner that the pressure in the autoclave is always less by 0.5 Kg/cm$^2$ than the pressure of vapor saturated with vinyl chloride at 50° C. During the same period of time a solution is introduced containing 10 grams of sodium dodecylbenzene sulfonate in 200 cm$^3$ of water. The latex obtained has a solids content equal to 60%. Its particle size distribution has two monodisperse populations; 71% by weight of the particles have size 0.9 micron, and 29% has a size 0.1 microns.

EXAMPLE 4

For the purposes of comparison, the procedure of Example 3 was followed but the seed latex had an amount of surfactant corresponding to 120% of the amount necessary to cover the entire surface of the particles. In the course of the reaction, the latex coagulated. An electron-microscope examination showed that the particle size was spread over the range 0.05 to 0.8 microns. This is not an illustration of the method according to this instant invention.

EXAMPLE 5

Into a stainless steel autoclave of 3 liter capacity, there is introduced:

- 800 g Water
- 300 g Seed latex providing an amount of dry solids equal to 10% by weight of monomer; particle size 0.4 micron, dry solids 33%; containing sufficient sodium alkylnaphthalene sulfonate to effect 50% coverage of particle surface.
- 8 g Ammonium persulfate
- 3 g 30% aqueous solution of Ammonia
- 1 g Ammonium 2-ethyl-hexanoate corresponding to 0.1% by weight on monomer.

A vacuum of 600-700 mm mercury is made in the autoclave and 1,000 grams vinyl chloride are introduced. The autoclave temperature is raised to 40° C. After 3 hours of reaction, there is introduced continuously over a period of 3 hours a solution of 9 grams alkylnaphthalene sulfonate of sodium dissolved in 300 grams of water. A latex is obtained having 41% solids. It has two monodisperse particle populations, 89%, by weight, of the particles having size 0.83 micron and 11% having size 0.25 micron.

EXAMPLE 6

Into a glass-lined steel autoclave of 16 liter capacity, supplied with an agitating system turning at 150 rotations per minute, there is charged:

- 5,000 g Water
- 500 g Seed latex, providing an amount of dry solids equal to 5% by weight of monomer; particle size 0.6 micron, dry solids 30% containing sufficient of nonyl phenol, oxyethylated with 10 ethylene oxide units per mol, to effect 45% coverage of total particle surface.
- 7 g Trisodium phosphate
- 15 g Ammonium persulfate
- 5 g Sodium sulfite
- 0.1 g Ferrous sulfate
- 1.5 g Sodium dodecylbenzene sulfonate corresponding to 0.05% by weight on monomer.

A vacuum of 600–700 mm of Hg is made, and 600 grams of vinyl chloride are charged and heated to 45° C. When the pressure in the autoclave falls, 2,400 grams of vinyl chloride and a solution of 30 grams sodium dodecylbenzene sulfonate dissolved in 1 Kg. of water is added gradually over a period of 3 hours. A latex is obtained having 30% by weight dry solids. It consists of two populations of monodisperse particles corresponding to 84% by weight having 1.7 micron size and 16% having 0.17 micron size.

EXAMPLE 7

Into a glass-lined steel autoclave of 16 liter capacity, fitted with stirring means, there is introduced:

- 4,000 g Water
- 390 g Seed latex providing an amount of dry solids equal to 5% by weight of monomers; particle size 0.25 micron, dry solids 42%; containing sufficient of a sulfosuccinate (AEROSOL X268) to effect 25% coverage total particle surface.
- 6 g Sodium acetate
- 15 g Potassium persulfate
- 2 g Sodium laurylsulfate corresponding to 0.06% by weight of monomers.

A vacuum of 600–700 mm of mercury is made in the autoclave and 3,000 grams of vinyl chloride and 300 grams of vinyl acetate are charged. The contents are heated to 50° C. After 2 hours, there is added continuously over a period of 2 hours a solution of 30 g of sodium laurylsulfate dissolved in 1 Kg. of water. A latex is obtained whose dry solids content is 37% by weight. It consists of two monodisperse populations, 68% by weight of the particles having 0.75 micron size and 32% by weight having 0.14 micron size.

EXAMPLE 8

Into a glass-lined autoclave of 16 liter capacity, there is introduced:

- 3,500 g Water
- 450 g Seed latex providing an amount of dry solids equal to 6% by weight of monomer; particle size 0.4 micron, dry solids 40%; containing sufficient sodium dioctylsulfosuccinate to effect 35% coverage of total particle surface
- 38 g Lauric acid 6 g Ammonium laurate (0.2% by weight of monomer)
- 10 g Ammonium persulfate A vacuum of 600–700 mm. of mercury is made in the autoclave and 3000 grams vinyl chloride are added. The contents are heated to 50° C. After 1 hour of reaction a continuous addition is made over a period of 2.5 hours of 100 grams of 3% aqueous ammonia. A latex is obtained whose dry solids content is 41% by weight. It consists of two monodisperse populations of particles, 59% by weight of the particles having size 0.65 micron and 41% having weight 0.3 micron.

EXAMPLE 9

A glass-lined autoclave of 16 liter capacity is charged with:

5,000 g Water
770 g Seed latex providing an amount of dry solids equal to 9% by weight of monomer; particle size 0.3 micron, dry solids 35%; containing sufficient sodium salt of a $C_{12}$–$C_{15}$ Oxo acid to effect 30% coverage of seed particle surface.
30 g Oxyethylated nonyl phenol having 10 ethylene oxide units/mol. Corresponds to 1% on weight of monomer.
8 g Sodium carbonate
10 g Sodium persulfate After having purged the reactor with nitrogen 3000 grams of vinyl chloride are charged. The temperature is raised to 53° C. and four equal fractions of a solution of 25 grams of sodium lauryl sulfate dissolved in 1 liter of water, are introduced respectively after 30 minutes, 1 hour, 1.5 hours and 2 hours. A latex is obtained whose dry solids content is 31%. It has two monodisperse populations of particles, one corresponding to 61% by weight of the particles, having means particle size 0.64 micron and the other corresponding to 39% by weight of the particles having mean particle size 0.45 micron.

EXAMPLE 10

A stainless steel autoclave of capacity 2 cubic meters and stirring means, is charged with:

700 kg Water
71 kg Seed latex providing an amount of dry solids equal to 4% by weight of monomer; particle size 0.16 micron; dry solids 45%; containing sufficient sodium dodecylbenzene sulfonate (NANSA) to effect 60% coverage of total seed particle surface
300 g Sodium hydroxide
600 g Potassium persulfate
1.6 Kg Sodium laurate, corresponding to 0.2% by weight on monomer.

After having made a vacuum of 600–700 mm of mercury, 800 Kg of vinyl chloride are charged. Temperature was raised to 40° C. After proceeding for 2 hours, 258 kg of a 3% by weight sodium dioctyl sulfosuccinate aqueous solution is added continuously over a period of 8 hours. A latex is obtained whose dry solids content is 41%. It has two monodisperse populations of particles, one corresponding to 84% by weight of total particles having a mean size of 0.62 micron, and the other corresponding to 16% of the weight of particles having mean particle size 0.22 micron.

EXAMPLE 11

By way of comparison, the procedure of Example 10 is followed except that sodium laurate is replaced by an equivalent quantity of sodium dodecylbenzene sulfonate (NANSA). The latex obtained has the same solids content but consists of one predominant population spread widely around 0.65 micron, encompassing 96% by weight of the particles, while 4% of the particles have size between 0.02 and 0.1 micron. This is not an example of the instant invention but illustrates the unsatisfactory particle size distribution when the surfactant used to prepare the complete latex is of the same chemical type as the surfactant used to form the seed.

EXAMPLE 12

Into a stainless steel autoclave having a 6 liter capacity and an agitator, there is charged:

1,500 g Water
120 g Seed latex providing an amount of dry solids equal to 3% by weight of monomer; particle size 0.45 micron; dry solids 40%; containing sufficient sodium salt of sulfonated alkyl diphenyl ether (DOWFAX 2A1) to effect 30% coverage of particle surface.
1 g Sodium bicarbonate
25 g Ammonium persulfate
3 g Lauric acid
12 g Myristic acid After making a vacuum of 600–700 mm of mercury, 100 grams of propylene and 1,500 grams of vinyl chloride are introduced. The autoclave is heated to 35° C. After 3 hours, continuous addition is made, over a period of 6 hours, of 150 grams of a 2% by weight aqueous solution of sodium hydroxide. The latex obtained has 45% by weight dry solids and there are two populations of particles, 74% by weight of them having mean particle size 0.9 micron and 26% having mean particle size 0.2 micron.

What is claimed is:

1. A method of preparing a stable latex having two monodisperse populations of vinyl chloride polymer or copolymer particles, one population corresponding to between about 5 and 50% of the total weight of particles and having a mean particle diameter between about 0.1 and 0.5 micron, and the other population containing the remainder of the latex particles and having a mean particle diameter greater than 0.5 and less than 2 microns;

which method comprises polymerizing in aqueous emulsion, vinyl-polymerizable monomers containing at least 60% by weight vinyl chloride, and the remainder at least one monomer copolymerizable therewith in the presence of both (a) a vinyl chloride polymer or copolymer seed latex, having its particles protected by a "first" emulsifier selected from the group consisting of nonionic and anionic surfactants in an amount less than about 100% coverage of particle surfaces and (b) a "second" emulsifier selected from the same group as specified for the "first" emulsifier whose chemical composition is different from that used as the "first" emulsifier.

2. Method of claim 1 wherein the mean diameter of the seed latex particles is between about 0.15 and 0.6 microns.

3. Method of claim 2 wherein the quantity of seed latex used is sufficient to provide between about 0.5% and 20% of dry solids based on the total weight of said monomers.

4. Method of claim 1 wherein the amount of the "second" emulsifier corresponds to from about 0.01% to 2% by weight of total said monomers.

5. Method of claim 1 wherein the monomers are 100% vinyl chloride.

6. A stable latex containing greater than about 45% and up to about 65% solids comprising two monodisperse populations of a vinyl chloride polymer or copolymer, one of said populations being smaller particles of mean diameter between about 0.1 and 0.5 microns and the other being larger particles of mean diameter greater than about 0.5 and less than 2 microns, the total weight of the smaller particles corresponding to between about 5% and 50% of the total latex particle weight.

* * * * *